United States Patent
Chung et al.

(10) Patent No.: US 9,507,340 B2
(45) Date of Patent: Nov. 29, 2016

(54) TOOL PATH PART PROGRAM MODIFICATION SYSTEM OF NC MACHINE TOOL

(75) Inventors: Dae Hyuk Chung, Gyeongsangnam-do (KR); Jong Myoung Park, Gyeongsangnam-do (KR); Joo Sik Lee, Gyeongsangnam-do (KR)

(73) Assignee: Doosan Machine Tools Co., Ltd., Gyeongsangnam-do (KR)

( * ) Notice: Subject to any disclaimer, the term of this patent is extended or adjusted under 35 U.S.C. 154(b) by 332 days.

(21) Appl. No.: 13/991,803

(22) PCT Filed: Nov. 1, 2011

(86) PCT No.: PCT/KR2011/008246
§ 371 (c)(1),
(2), (4) Date: Jun. 5, 2013

(87) PCT Pub. No.: WO2012/077910
PCT Pub. Date: Jun. 14, 2012

(65) Prior Publication Data
US 2013/0253694 A1  Sep. 26, 2013

(30) Foreign Application Priority Data
Dec. 6, 2010  (KR) .................. 10-2010-0123338

(51) Int. Cl.
G06F 17/50 (2006.01)
G05B 19/4069 (2006.01)

(52) U.S. Cl.
CPC . *G05B 19/4069* (2013.01); *G05B 2219/35353* (2013.01)

(58) Field of Classification Search
None
See application file for complete search history.

(56) References Cited

U.S. PATENT DOCUMENTS 5,532,933 A * 7/1996 Nakata ...................... 700/182
6,128,546 A * 10/2000 Basista ............. G05B 19/4205
219/121.67

(Continued)

FOREIGN PATENT DOCUMENTS

CN 1122018 A 5/1996
CN 1749898 A 3/2006

(Continued)

OTHER PUBLICATIONS

Search Report dated Jun. 21, 2012 and written in Korean with English translation attached for International Patent Application No. PCT/KR2011/008246 filed Nov. 1, 2011, 5 pages.
Chinese Office Action date Dec. 9, 2014 for corresponding Chinese Application No. 201180058409.3, 5 pages.

*Primary Examiner* — Sean Shechtman
(74) *Attorney, Agent, or Firm* — John D. Veldhuis-Kroeze; Westman, Champlin & Koehler, P.A.

(57) ABSTRACT

A tool path part program modification system of an NC machine tool according to an aspect of the present disclosure, includes: a human-machine interface unit which receives a tool path part program having one or more processing blocks; an NC kernel unit which interprets the part program inputted to the human-machine interface unit for each processing block, and generates each processing block information; a tool path modification module unit which sequentially calls the processing block information interpreted by the NC kernel unit, and modifies a consecutive rapid transfer processing block group such that tool paths are reduced, when the consecutive rapid transfer processing block group is present in which the predetermined reference number or more of processing blocks including rapid transfer commands are consecutively included; and a simulator unit which simulates the part program for each processing block interpreted by the NC kernel unit.

6 Claims, 6 Drawing Sheets

(56) References Cited

U.S. PATENT DOCUMENTS

| | | |
|---|---|---|
| 6,535,788 B1* | 3/2003 | Yoshida et al. ............... 700/191 |
| 2002/0040629 A1* | 4/2002 | Bedi et al. ..................... 82/118 |
| 2002/0091460 A1* | 7/2002 | Allen ................. G05B 19/4166 700/173 |
| 2002/0133264 A1* | 9/2002 | Maiteh et al. ................. 700/182 |
| 2005/0085939 A1* | 4/2005 | Nakazato et al. ............ 700/173 |
| 2009/0326892 A1* | 12/2009 | Lin ................................... 703/7 |

FOREIGN PATENT DOCUMENTS

| | | |
|---|---|---|
| JP | 10-293606 | 11/1998 |
| JP | H10293606 A | 11/1998 |
| JP | 2000-084794 | 3/2000 |
| JP | 2008-009758 | 1/2008 |
| KR | 1020090006445 | 1/2009 |
| KR | 100898034 B1 | 5/2009 |

\* cited by examiner

<PROCESSING PATH BEFORE APPLICATION>

<PROCESSING PATH AFTER APPLICATION>

TOOL PATH PART PROGRAM MODIFICATION SYSTEM OF NC MACHINE TOOL

CROSS-REFERENCE TO RELATED APPLICATION

This application is a Section 371 National Stage application of International application No. PCT/KR2011/008246, filed Nov. 1, 2011 and published, not in English, as WO2012/077910 on Jun. 14, 2012.

FIELD OF THE DISCLOSURE

The present disclosure relates to a numerical control system capable of reducing air cut (a state of transferring uncut tools), which is generated unnecessarily, in order to shorten a processing time of a part program which is made for automatic processing of tapping processing, lathe turning processing, and milling processing of a numerical control (NC) machine tool.

BACKGROUND OF THE DISCLOSURE

In general, generation of a tool path for an NC machine tool is directly made by an operator, or made by an automated manner such as a CAM, an interactive system, or the like.

In a case in which the tool path is generated by automation systems such as a CAM, an interactive system, and the like, a user inputs information on measurements of cutting components, cutting tools, order of processing, and methods of processing, which are necessary for an actual cutting process, and in addition to the aforementioned information, the user inputs additional parameters that are necessary to generate a transfer path to transfer a tool between actual cutting processes. Here, while considering not only processing efficiency of the tool path that is generated but also processing safety such as collision avoidance between tools and work pieces, or tools and a machine tool, or the like, the user inputs parameters, and the automation systems generate proper tool paths on the basis of the inputted parameters.

Here, the tool path is a main element that determines processing productivity, and proper selection of tools, selection of proper transfer speeds (feed), and the like are main factors related to a processing time, and for this reason, automated tool path generating software such as the CAM, the interactive system, or the like, helps the user to input proper parameters, or provides the user with various functions such as automated algorithm, or the like, thereby helping the user to generate high efficient tool paths.

However, substantially, in addition to the actual cutting processes, minimizing air cut is another element that determines efficiency of the tool path, but is a part that many automation systems neglect to consider.

That is, for convenient and quick generation of enormous processing programs, determination of a retreat path, a movement path, and an approach path of the tool related to the air cut is determined by several parameters inputted by the user, and generally, these parameters are determined as values having margins in consideration of safety. This manner has an advantage of quickly generating the processing program, but causes a problem in that the air cut is excessively generated.

The discussion above is merely provided for general background information and is not intended to be used as an aid in determining the scope of the claimed subject matter.

SUMMARY

This summary and the abstract are provided to introduce a selection of concepts in a simplified form that are further described below in the Detailed Description. The summary and the abstract are not intended to identify key features or essential features of the claimed subject matter, nor are they intended to be used as an aid in determining the scope of the claimed subject matter.

An aspect of the disclosure has been made in an effort to solve the aforementioned problem, and an object of the disclosure is to shorten a processing time by individualizing a transition path (a retreat path, a movement path, and an approach path of a tool), which is uniformly generated in an automated manner, correspondingly to each situation, and optimizing the path.

To achieve the aforementioned object, the tool path is modified in a predetermined pattern by recognizing air cut that is generated in an actual part program using a three dimensional graphic processing simulator, which may simulate a movement of a machine tool during processing to be identical to an actual situation, modifying an air cut path in a predetermined pattern, checking whether a collision occurs in the modified path using the simulator.

In addition, an aspect of the disclosure may be applicable to only a specific position in accordance with an intention of a user by introducing a special G code, which may command operation and stop of the present disclosure, to an NC kernel unit (NC Kernel).

More specifically, a tool path part program modification system of an NC machine tool according to an aspect of the present disclosure, including: an HMI unit (100) which receives a tool path part program having one or more processing blocks which automate and perform tool paths for processing a work piece by using tools of the NC machine tool; an NC kernel unit (200) which interprets the part program inputted to the HMI unit (100) for each processing block, and generates each processing block information; and a tool path modification module unit (300) which sequentially calls the processing block information interpreted by the NC kernel unit (200), and modifies a consecutive rapid transfer processing block group such that tool paths are reduced and collision between the tool and the work piece does not occur, when the consecutive rapid transfer processing block group is present in which the predetermined reference number or more of processing blocks including rapid transfer commands are consecutively included.

The system of an aspect of the present disclosure may further include a simulator unit (400), and the simulator unit (400) may simulate the part program in three dimensions for each processing block interpreted by the NC kernel unit (200).

By using the simulator unit (400), the tool path modification module unit (300) may modify each of the processing blocks included in the consecutive rapid transfer processing block group, simulate the modified processing block by using the simulator unit (400), and select the modified processing block when a collision between the tool and the work piece does not occur.

In addition, the system of an aspect of the present disclosure may further include a tool path pattern modification DB (500) in which one or more modification processing block patterns are stored corresponding to the consecutive rapid transfer processing block group.

By using the tool path pattern modification DB (500), the tool path modification module unit (300) may extract one or more modification processing block patterns corresponding to the consecutive rapid transfer processing block group from the tool path pattern modification DB (500), and then select the modification processing block pattern having the shortest tool path among them.

In addition, according to an aspect of the present disclosure, the part program may further include an interpretation start point code (10) and an interpretation end point code (40) which are special G codes and allows the NC kernel unit (200) to recognize a start point and an end point of interpretation of the processing block.

As described above, an aspect of the present disclosure serves to reduce the overall processing time by shortening a transfer time of the consecutive rapid transfer processing block, and provides a function of automatically increasing efficiency of a processing program without intervention of a user using the three-dimensional simulator unit (400) and the tool path modification module unit (300).

DESCRIPTION OF MAIN REFERENCE NUMERALS OF DRAWINGS

100: HMI unit
200: NCK (NC kernel) unit
300: Tool path modification module unit
400: Simulator unit
500: Tool path pattern modification DB
10: Interpretation start point code
20, 30: Processing block
40: Interpretation end point code
31: Consecutive rapid transfer processing block group before being modified
32: Tool path pattern processing block after being modified
N: Total number of processing blocks that configures part program
M: Number of applicable modification tool path patterns

DETAILED DESCRIPTION

Hereinafter, an operational principle with respect to an exemplary embodiment of the disclosure will be described in detail with reference to the accompanying drawings and descriptions. However, the drawings illustrated below and the descriptions that will be described below are preferred implementation methods among various methods for effectively explaining characteristics of the disclosure, but the embodiment of the disclosure is not limited only to the below drawings and the descriptions.

Hereinafter, an exemplary embodiment according to an aspect of the disclosure will be described in detail with reference to the accompanying drawings. In the below description, a 'consecutive rapid transfer processing block group' is defined as a group of a plurality of processing blocks consecutively including the predetermined number (for example, three) or more of rapid transfer command (G00)processing blocks.

Figure 1:
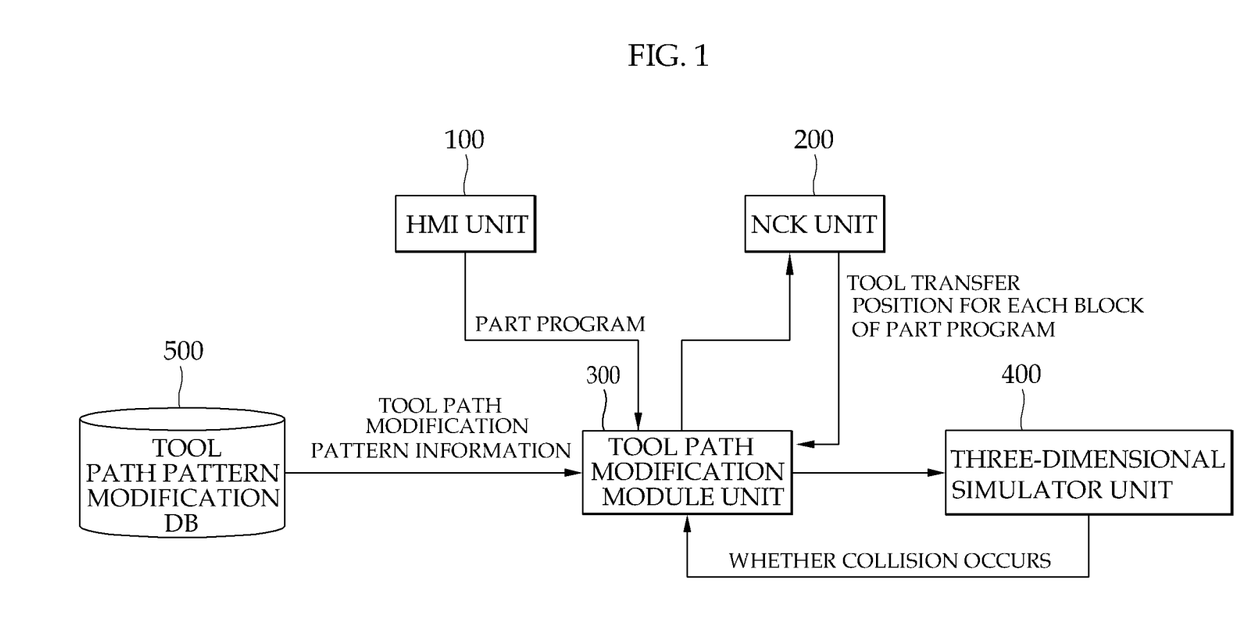
FIG. 1 is a configuration block diagram of a tool path part program modification system of an NC machine tool according to an aspect of the present disclosure.

FIG. 1 is a configuration block diagram of a tool path part program modification system of an NC machine tool according to an aspect of the present disclosure.

As illustrated, a system according to an aspect of the present disclosure includes an HMI unit 100, an NC kernel unit 200, a tool path modification module unit 300, a simulator unit 400, and a tool path pattern modification DB 500.

The HMI unit 100 provides a human-machine interface in order for an operator to input a tool path part program. The operator inputs the tool path part program including one or more processing blocks by using the HMI unit 100.

The NC kernel unit or an NCK unit 200 interprets the part program inputted to the HMI unit 100 for each processing block to generate processing block information.

The tool path modification module unit 300 sequentially calls the processing block information interpreted by the NC kernel unit 200, and determines whether a consecutive rapid transfer processing block group is present in which the predetermined reference number (for example, three) or more of processing blocks including rapid transfer commands (G00)are consecutively included. As a determination result, in a case in which the consecutive rapid transfer processing block group is present in which the predetermined number (for example, three) or more of the rapid transfer commands (G00)is included, the consecutive rapid transfer processing block group is modified so that a length of a tool path is reduced, and a collision between the tool and the work piece does not occur.

The tool path modification module unit 300 modifies each processing block included in the consecutive rapid transfer processing block group (a portion in which the predetermined number or more of G00commands, for example, three or more G00 commands are consecutive), simulates the modified processing block by using the simulator unit 400, which will be described below, determines whether a collision between the tool and the work piece occurs, and then selects the modified processing block in a case in which a collision does not occur.

In addition, the tool path modification module unit 300 extracts one or more modification processing block patterns corresponding to the consecutive rapid transfer processing block group from the tool path pattern modification DB 500, which will be described below, and then selects the modification processing block pattern having the shortest tool path among the modification processing block patterns, and modifies a rapid transfer path correspondingly to the pattern.

The simulator unit 400 simulates the part program for each processing block interpreted by the NC kernel unit 200, and simulates the rapid transfer path modified by the tool path modification module unit 300, thereby automatically checking whether the modified rapid transfer path causes a collision between the tool and the work piece, and informs the tool path modification module unit 300 of whether a collision occurs, thereby serving to help the tool path modification module unit 300 to select the modification processing block pattern.

The one or more modification processing block patterns are stored in the tool path pattern modification DB 500 correspondingly to the consecutive rapid transfer processing block group.

Figure 3:
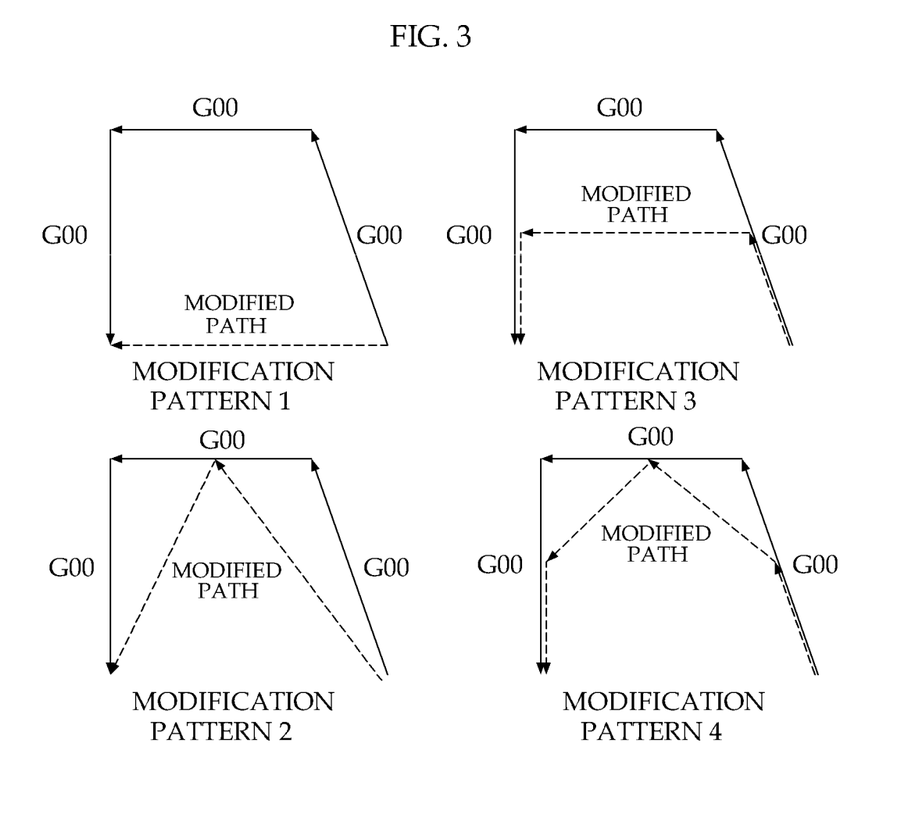
FIG. 3 is a conceptual view for explaining a process of modifying a tool path pattern by a tool path modification module unit 300 of an aspect of the present disclosure.

FIG. 3 is a conceptual view for explaining a process of modifying the tool path pattern by the tool path modification module unit 300 of an aspect of the present disclosure.

The tool path indicated by the solid line is the 'consecutive rapid transfer processing block group (in a case in which the predetermined number or more of G00processing blocks are consecutive)' which is first extracted from the part program. In the example illustrated, a case in which three rapid transfer G00processing blocks are consecutively included is the consecutive rapid transfer processing block group.

The tool path indicated by the dotted line is one or more modification processing block patterns corresponding to the consecutive rapid transfer processing block group, and stored in the tool path pattern DB 500.

In an example illustrated, a total of four types of modification processing block patterns having modification patterns 1 to 4 are illustrated. The modification patterns 1 to 4 may be designated in order of length of the tool path. That is, the modification pattern 1 is a modification pattern in which the tool path is the shortest, a modification pattern 4 is a modification pattern in which the tool path is the longest, and the modification pattern having the tool path of a short length may be set to have a high priority.

When a specific consecutive rapid transfer processing block group is detected, the tool path modification module unit 300 extracts the corresponding modification patterns 1 to 4 from the tool path pattern DB 500, simulates from the modification pattern 1, which has the tool path having the shortest length and has the highest priority, using a simulator unit 400, and then determines whether a collision between the tools and the work pieces occurs.

As a simulation result of the modification pattern 1, in a case in which the collision does not occur, the original consecutive rapid transfer processing block group (solid line) is changed into a modification pattern 1 (dotted line).

However, in a case in which a collision occurs as a simulation result of the modification pattern 1, the modification pattern 2, as the next order of priority, is simulated, and whether or not a collision occurs is determined, and then in a case in which a collision does not occur, the original consecutive rapid transfer processing block group (solid line) is changed into the modification pattern 2, but in a case in which a collision occurs, as the same method, in the order of the modification patterns 3 and 4 as the next order of priority, simulations are performed, respectively, and then whether or not a collision occurs is checked, and consequently, the modification pattern is selected when a collision does not occur.

Next, referring to FIGS. 1 and 2 to 6, a process of modifying the tool path by the system according to an aspect of the present disclosure will be described.

Figure 2:
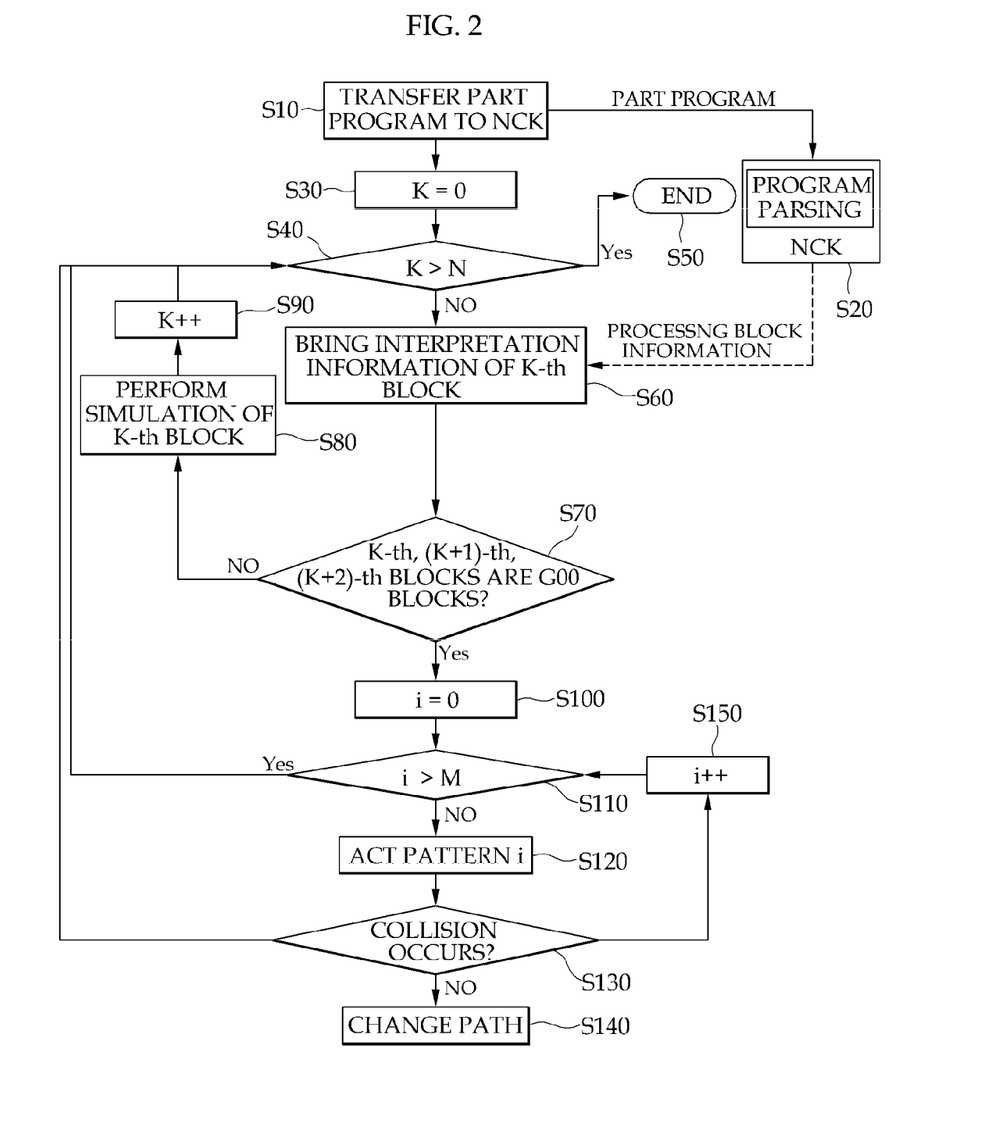
FIG. 2 is a flowchart illustrating a process of modifying a tool path by a system according to an aspect of the present disclosure.

FIG. 2 is a flowchart illustrating a process of modifying the tool path by the system according to an aspect of the present disclosure. In the flowchart, N means the total number of processing blocks that configures the part program, and M means the total number of modification tool path patterns that are applicable corresponding to the particular consecutive rapid transfer processing block group.

When the part program is inputted to the HMI unit 100, the tool path modification module unit 300 transfers the part program inputted to the HMI unit 100 to the NC kernel unit (hereinafter referred to as NCK unit) 200 (S 10).

The NCK unit 200 interprets the transferred part program, calculates movement of the tool for each processing block of the part program, and then generates and stores the processing block information (S20).

After the processing blocks (N pieces), which configures the part program, are interpreted by the NCK unit 200, the tool path modification module unit 300 sequentially calls the processing block information which is interpreted by the NCK unit 200, and requests the simulator unit 400 to simulate movement of the machine tool by using the called processing block information (S30, S40, and S60).

While the aforementioned processes are repeatedly performed, the tool path modification module unit 300 checks whether the predetermined number (for example, three) of the G00processing blocks, which mean a rapid transfer among the processing blocks, are consecutively present (S70).

As the check result, in a case in which the predetermined number of (for example, three) of G00processing blocks, which mean a rapid transfer, are not consecutively present, a process of performing a simulation of corresponding (K-th) processing block and sequentially bringing interpretation information with respect to the next ((K+1)-th) processing block is repeatedly performed with respect to the processing blocks (N pieces) which configure the part program (S80, and S90).

In contrast, as the check result, in a case in which the predetermined number of (for example, three) of G00processing blocks, which mean a rapid transfer, are consecutively present, the corresponding M pieces of modification tool path patterns are extracted from the tool path pattern modification DB 500, the modification tool path pattern (i-th) is sequentially brought, and then the G00block is modified in accordance with the brought pattern (S100 to S150).

That is, G00block (i-th), which is sequentially modified for each modification tool path pattern having M pieces, which has been extracted from the tool path pattern modification DB 500, is simulated by the simulator unit 400, and whether a collision between the tool and the work piece to be cut occurs is checked (S100, S110, S120, and S130).

When a collision occurred as the check result, the G00block is modified by bringing the next modification tool path pattern ((i+1)-th) from the tool path pattern modification DB 500, and this operation is repeatedly performed with respect to M pieces of modification tool path patterns (i=1, 2, . . . M) (S130 and S150)

In contrast, when a collision did not occur as the check result, the corresponding modification tool path pattern is determined as a modified path (S140).

As such, the simulations are performed to M pieces of modification tool path patterns, and the G00blocks are modified while changing the modification tool path pattern until a collision does not occur. If there is no pattern where a collision does not occur, the G00blocks in a state before being modified are maintained, and the operation ends (S50).

Next, referring to FIGS. 4 to 6, the part program before being modified and after being modified, and an example of a process of modifying a processing path according to the part program will be described.

Figure 4:
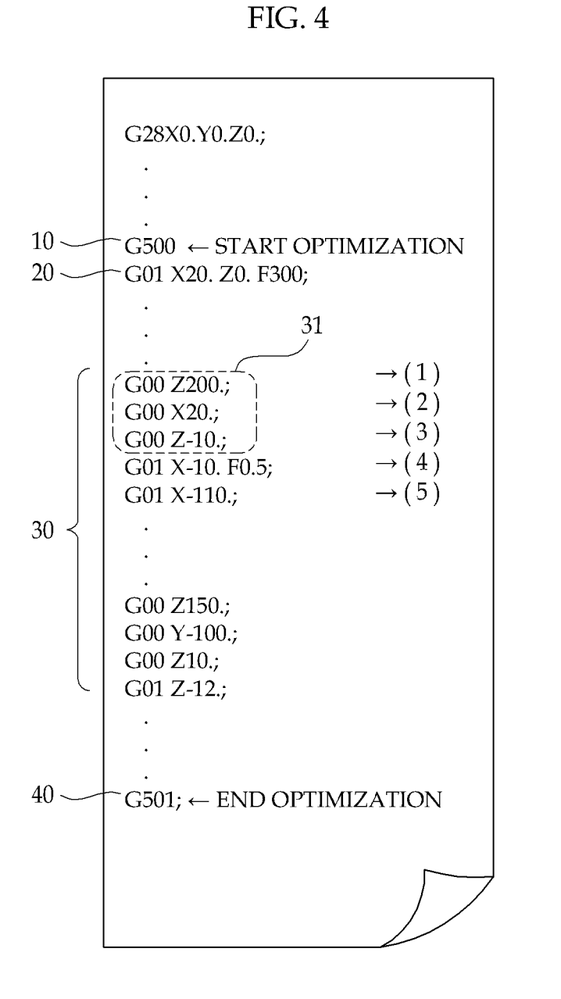
FIG. 4 is a view illustrating an example of a part program before being modified.
Figure 5:
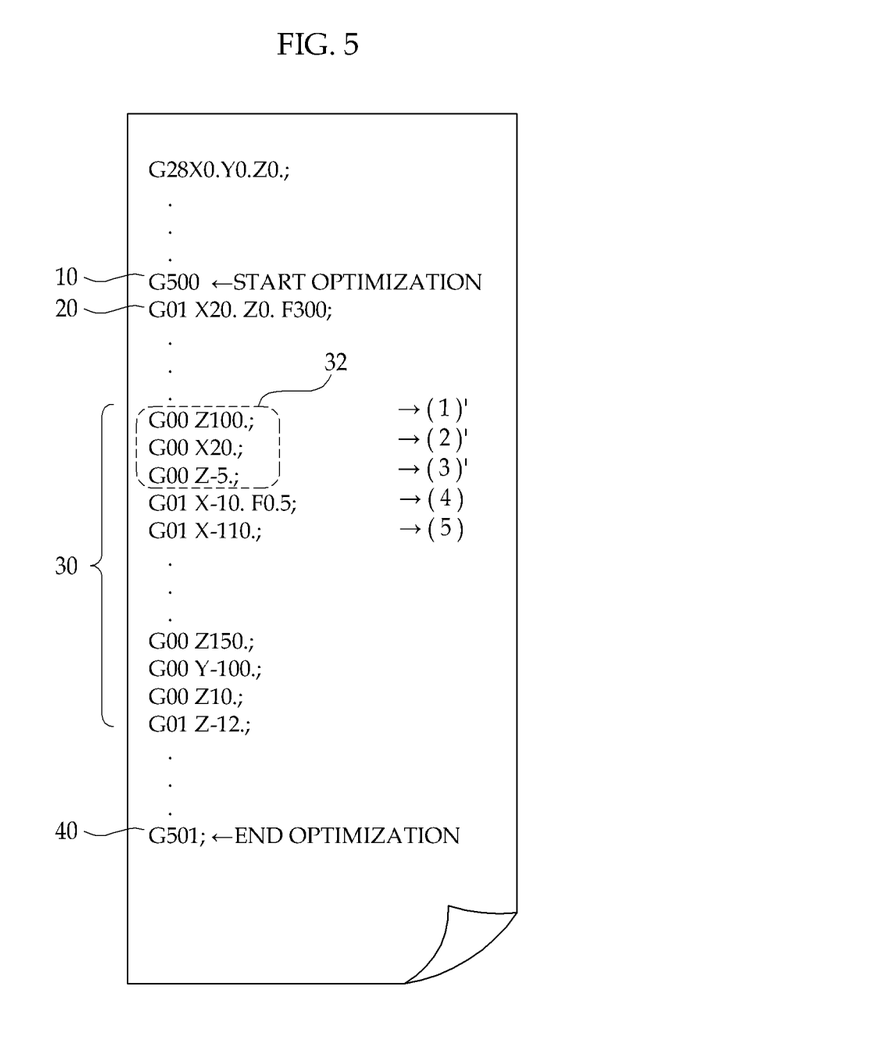
FIG. 5 is a view illustrating an example of a part program after being modified.
Figure 6:
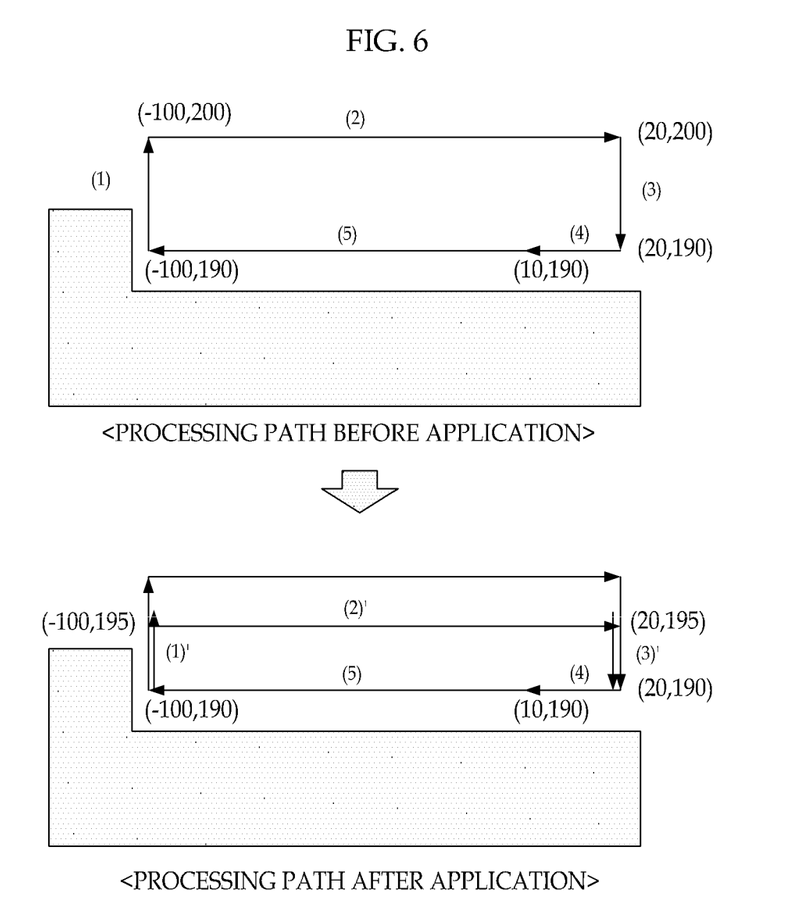
FIG. 6 illustrates a comparison of a processing path before applying modification and a processing path after applying modification.

FIG. 4 illustrates an example of the part program before being modified, FIG. 5 illustrates an example of the part program after being modified, and FIG. 6 illustrates a comparison of a processing path before applying modification and a processing path after applying modification. In FIGS. 4 and 5, G00means a non-cutting rapid transfer command, G01 means a cutting processing command, and in a G01 command, a transferring speed (F, mm/min) is separately designated, unlike the G00.

In FIG. 4, the 'consecutive rapid transfer processing block group' in which the predetermined number (three) or more of a rapid transfer G00are consecutively included is indicated by reference numeral 31, and in FIG. 5, the pattern modified by the tool path modification module unit 300 is indicated by reference numeral 32.

FIG. 6 illustrates a comparison of a processing path before applying modification (FIG. 4), and a processing path after applying modification (FIG. 5).

Meanwhile, according to the exemplary embodiment, a region where the tool path needs to be modified in the part program may be designated as an interpretation start point code 10 and an interpretation end point code 40 by using special G codes.

That is, as illustrated in FIG. 4, the part program includes a plurality of processing blocks 20 and 30, a region of the tool path that is needed to be modified may be designated as the interpretation start point code 10 and the interpretation end point code 40 by using a special G code. In an example illustrated, the interpretation start point code 10 is designated as 'G500 ', and the interpretation end point code 20 is designated as 'G501'.

The NCK unit 200 searches whether the special G codes G500 and G501, which means the interpretation start point code 10 and the interpretation end point code 40, are present in the part program, and in a case in which the special G codes are present, the tool path modification module unit 300 starts the modification of the tool path with the interpretation start point code 10 (G500) and ends the modification of the tool path with the interpretation end point code 40 (G501) in the part program.

By designating the interpretation start point code 10 (G500), and the interpretation end point code 20 (G501), a region of the entire part program, where the operator wants to modify, is arbitrary designated, and therefore a time taken to perform an arithmetic operation may be reduced.

That is, the operation of finding out the three consecutive G00blocks to reduce the air cut, and applying a tool path modification pattern is limited to the region displayed by the special G codes G500 and G501.

In addition, according to the exemplary embodiment, the tool path modification pattern may be defined by the user in accordance with a type of processing such as casting processing, tapping processing, hole processing, or the like, and this information may be stored in the tool path modification module 300 and the tool path pattern DB 500.

While specific exemplary embodiments of the present disclosure have been illustrated in the drawings and described above, the present disclosure is not limited thereto, and it may be easily understood by the person skilled in the art that claims disclosed below may be variously modified and changed without departing from the spirit and field of the present disclosure.

The aforementioned descriptions are just for illustratively explaining the technical spirit of the present disclosure, and the person skilled in the art may alter and modify the present disclosure without departing from the essential characteristics of the present disclosure.

That is, because the exemplary embodiments disclosed in the present disclosure do not limit the technical spirit of the present disclosure, but explain the technical spirit of the present disclosure, the scope of the technical spirit of the present disclosure is not limited to the exemplary embodiments.

Accordingly, the protective scope of the present disclosure should be interpreted by the claims disclosed below, and all technical spirit within the equivalent scope of the claim should be interpreted to be included in the scope of the present disclosure.

Although the present disclosure has been described with reference to exemplary and preferred embodiments, workers skilled in the art will recognize that changes may be made in form and detail without departing from the spirit and scope of the disclosure.

The invention claimed is:

1. A NC machine tool, comprising:
a human-machine interface unit configured to receive a tool path part program having one or more processing blocks configured to automate and perform tool paths for processing a work piece;
an NC kernel unit configured to:
interpret the part program inputted to the human-machine interface unit for each processing block; and
generate processing block information according to the part program interpreted by the NC kernel unit; and
a tool path modification module unit configured to:
sequentially call the processing block information generated by the NC kernel unit; and
modify a consecutive non-cutting rapid transfer processing block group of the processing block information such that tool paths are reduced and collision between a tool of the NC machine tool and the work piece does not occur, when the consecutive non-cutting rapid transfer processing block group is present in which a predetermined reference number or more of processing blocks including non-cutting rapid transfer commands are consecutively included;
a tool path pattern modification data base in which one or more modification processing block patterns are stored corresponding to the consecutive rapid transfer processing block group;
the tool path modification module unit further configured to:
extract several modification processing block patterns corresponding to the consecutive rapid transfer processing block group from the tool path pattern modification data base; and
select one of the extracted modification processing block patterns having the shortest tool path;
a simulator unit configured to simulate the one selected extracted modification processing block pattern;
the tool path modification module unit further configured to select the one selected simulated processing block pattern when a collision between the tool and the work piece does not occur in the simulation; and
the tool configured to perform the one selected modification processing block pattern having the shortest tool path and that avoids a collision between the tool and the work piece.

2. The NC machine tool of claim 1, wherein the part program further includes an interpretation start point code and an interpretation end point code configured to allow the NC kernel unit to recognize a start point and an end point of interpretation of the processing block.

3. A method implemented by a NC machine, comprising:
receiving, by a processor, a tool path part program having one or more processing blocks configured to automate and perform tool paths for processing a work piece;
interpreting the part program for each processing block;

generating processing block information according to the interpreted part program;

sequentially calling the processing block information;

modifying a consecutive non-cutting rapid transfer processing block group of the processing block information such that tool paths are reduced and collision between a tool of the NC machine and the work piece does not occur, when the consecutive non-cutting rapid transfer processing block group is present in which a predetermined reference number or more of processing blocks including non-cutting rapid transfer commands are consecutively included;

storing, in a tool path pattern modification data base, one or more modification processing block patterns corresponding to the consecutive rapid transfer processing block group;

extracting several modification processing block patterns corresponding to the consecutive rapid transfer processing block group from the tool path pattern modification data base;

selecting one of the extracted modification processing block patterns having the shortest tool path;

simulating the one selected extracted modification processing block pattern;

selecting the one simulated processing block pattern when a collision between the tool and the work piece does not occur in the simulation; and performing, with the tool, the one selected simulated processing block pattern having the shortest tool path and that avoids a collision between the tool and the work piece.

4. The method of claim 3, wherein the part program further includes an interpretation start point code and an interpretation end point code to allow recognizing of a start point and an end point of interpretation of each processing block.

5. The method of claim 4, wherein the start point and the end point of the interpretation of each processing block limit the modifying of the consecutive non-cutting rapid transfer processing block group of the processing block information.

6. The method of claim 3, further comprising:

discarding the one simulated processing block pattern when a collision between the tool and the work piece occurs in the simulation;

selecting a second pattern of the extracted modification processing block patterns having the second shortest tool path;

simulating the second processing block pattern;

selecting the second simulated processing block pattern when a collision between the tool and the work piece does not occur in the simulation; and performing, with the tool attached to the NC machine, the second simulated processing block pattern having the second shortest tool path and that avoids a collision between the tool and the work piece.

* * * * *